July 14, 1970  G. B. PARRENT, JR., ET AL  3,520,610

PARTICLE DISTRIBUTION READOUT USING HOLOGRAPHIC METHODS

Filed March 8, 1965  2 Sheets-Sheet 1

} PRIOR ART

GEORGE B. PARRENT, Jr.
BRIAN J. THOMPSON
JOHN H. WARD
INVENTORS

BY
ATTORNEYS

July 14, 1970   G. B. PARRENT, JR., ET AL   3,520,610
PARTICLE DISTRIBUTION READOUT USING HOLOGRAPHIC METHODS
Filed March 8, 1965   2 Sheets-Sheet 2

GEORGE B. PARRENT, Jr.
BRIAN J. THOMPSON
JOHN H. WARD
INVENTORS

BY Alfred H Rosen
Thomas N. Tarrant

ATTORNEYS

United States Patent Office 3,520,610
Patented July 14, 1970

3,520,610
PARTICLE DISTRIBUTION READOUT USING HOLOGRAPHIC METHODS
George B. Parrent, Jr., Carlisle, Brian J. Thompson, Chelmsford, and John H. Ward, Billerica, Mass., assignors to Technical Operations, Incorporated, Burlington, Mass., a corporation of Delaware
Filed Mar. 8, 1965, Ser. No. 437,876
Int. Cl. G06k 9/08; G01n 15/02; G02b 5/18
U.S. Cl. 356—71                                6 Claims

ABSTRACT OF THE DISCLOSURE

Systems and methods of holographic photomicrography useful in the recording and reconstructing of volumes of stationary or moving particles are depicted. Recording is accomplished with pulsed laser illumination at a recording plane located in the far field of the individual particles in the object volume, but in the near field of the aperture defining the volume. Techniques are shown for removing background illumination during reconstruction.

---

This invention relates to the measurement of particles and their distribution in a fluid medium.

Analyzing particle density and size distribution in a fluid medium presents many problems. Since particles in a fluid medium tend to be in constant motion, no accurate analysis can be made unless such motion is effectively stopped during analysis. This is most commonly done by physically separating a sample volume from the mass body. However such separation always produces a sufficient disturbance to modify the density and/or distribution in the sample. For example, in a small volume of fog, liquid particles tend to merge and condense.

In order to minimize disturbance of the medium, it is desirable to make a quick record of the information in a sample volume and then use the record for separate detailed analysis. Conventional photographic techniques are inadequate due to the inability to achieve sufficent depth of field while maintaining resolution commensurate with accurate measurement.

A recent approach to analyzing particle density and distribution in a fluid medium is through diffraction patterns called holograms. The present knowledge of holograms begins with extensive work of D. Gabor in the late 1940's and a good description of holograms with reference to the work of Gabor can be found in "Principles of Optics" by Born & Wolf, 2nd Ed., 1964. pp. 453–458. A hologram, as described by Gabor, is a Fresnel diffraction pattern. When a Fresnel diffraction pattern of an object illuminated with coherent light is photographed and the photographic transparency is positioned in an optical system in the same plane, as when the photograph was made, a reconstructed image of the object will be brought to a focus in the same plane as if the object were in its original position and the hologram missing.

The hologram of Gabor, which we will call herein a "Fresnel" hologram, contains troublesome ambiguities due to a virtual image produced by the conjugate wave. In producing a hologram of particles suspended in a fluid medium, the applicants found that the ambiguity produced by the conjugate wave can be avoided by using far field diffraction instead of Fresnel diffraction. In order to obtain far field diffraction, the optical system must be such that the diffraction pattern is observed in the far field. The far field condition is defined by the relation $$z > \frac{d^2}{\lambda}$$

where $z$ is the distance from the diffracting aperture (which in this case would be any one of the particles in the sample volume) to the plane of observation (in this case the plane of the hologram), $d$ is the diameter of the largest particle or particle image and $\lambda$ is the wavelength of the light source. Fresnel diffraction occurs in the near field where $$z < \frac{d^2}{\lambda}$$

While the hologram must be stored in the far field of the individual objects, care must be taken to assure that the photograph is made in the near field of the illuminating beam. The near field for the illuminating beam must satisfy $$z < \frac{d^2}{\lambda}$$

where $d$ is the diameter of the beam at that plane in the sample volume nearest the beam source and $z$ is the distance from that plane to the plane at which the hologram is formed.

These relationships assume a substantially collimated illuminating beam, with a magnification of 1, as is hereinafter pointed out. As is well known, the physical length of an optical distance can be lengthened or shortened by means of lenses or mirrors, for example. By applying such means to alter (magnify or reduce) the apparent size of a particle the distance $z$ which will satisfy the far field condition can be altered, according to the relation $$z > \frac{2d^2m^2}{\lambda}$$

where $m$ is the magnification factor. Obviously, when $m$ = unity, this relationship becomes $$z > \frac{2d^2}{\lambda}$$

as is first stated above.

The hologram made using a far field diffraction pattern is referred to herein as a far field hologram. A hologram of this type can be made with the photographic apparatus placed in the midst of a particle cloud to be analyzed and, using a fast exposure to make the hologram, particle movement in the object plane of the photographic apparatus can be effectively stopped by the speed of the exposure. Thus, no separation of the sample volume is necessary. The hologram then becomes a complete representation of the undisturbed sample volume and can be stored and analyzed in detail at separate laboratory facilities.

It has been found that the hologram itself contains information which, if the object were a sample volume of particles in a fluid medium, will give particle distribution and density in the sample volume without loss due to deficiencies in depth of focus. In accordance with the present invention however, the far field hologram of the sample volume of particles dispersed in a fluid medium is used to reconstruct the sample volume and bring images of the separate particles in the sample volume to a sharp focus for measurement purposes. In this way, if desired, each particle can be analyzed separately and the total number of particles in the sample volume can be accurately counted. The invention also permits substantial contrast enhancement in the images produced with only simple and inexpensive additional components in the optical system. Thus, it is an object of the present invention to define a new method of analyzing particle size, distribution and density in a fluid medium.

It is a further object of the invention to define an optical system for separately bringing into focus images of the individual particles of an original sample volume stored photographically on a single photographic layer.

It is a further object of the present invention to define apparatus for enhancing the contrast in aerosol images reconstructed from a far field hologram.

Further objects and features of the invention will become apparent from reading the following description in connection with the drawings wherein like numerals designate like elements throughout.

Figure 1:
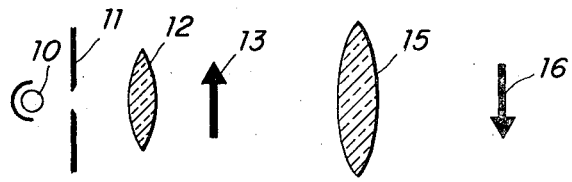
FIG. 1 is a diagrammatic illustration of a conventional one step system for optically forming an image from an object.

FIG. 1 illustrates a conventional optical system for imaging an object. In such a system, a light source 10 is limited by an aperture 11 and collimated by lens 12 to provide uniform illumination for the object 13. Light as modified by object 13 passes through a lens 15 and produces a real image 16 of the object.

Figure 2:
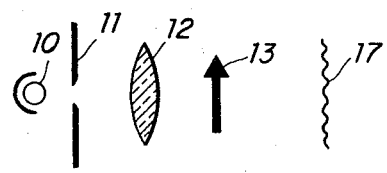
FIGS. 2 and 3 are diagrammatic illustrations showing the two optical steps used in forming a reconstructed image of an object using a hologram.
Figure 3:
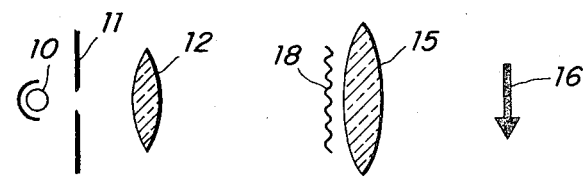

FIGS. 2 and 3 show the formation of a hologram and the reconstruction of the object from the hologram. Optical arrangements are shown comparable to that of FIG. 1 so that similarities in operation may be pointed out. The first major difference is that source 10 for purposes of a hologram in FIGS. 2 and 3 must produce coherent waves at the object 13 and the hologram 18. As used herein, coherent waves are waves that, when split up into a plurality of components, will have a phase difference, between the waves representing the components, that is substantially constant during the normal period of observation.

In FIG. 2 the illumination which would have reached lens 15 in FIG. 1 is intercepted by photosensitive member 17. The characteristics of the photosensitive member are not critical and it may be used to form either a negative or positive transparency of the pattern intercepted by it. The pattern intercepted by the photosensitive member will be in the nature of a diffraction pattern since the image is out of focus at the plane of member 17. The pattern developed on the photosensitive member or a print made from it is known as a "hologram."

In FIG. 3, object 13 has been removed from the optical system and hologram 18 has been positioned in the location occupied by photosensitive member 17 in FIG. 2. Lens 15 positioned exactly as in FIG. 1 focuses real image 16 in the image plane exactly as if object 13 occupied the object plane.

It is quickly seen that it requires two steps using a hologram to produce an image instead of the one step required for the conventional optical imaging system. Also for the hologram it is necessary to use a very special light source and add a photosensitive member. Despite these apparent disadvantages, the hologram has certain attributes that can be quite useful. The particular attribute that is of most interest for the present invention is lack of discriminaion against depth of focus in the hologram itself. This means that if the object has depth, that any plane of that depth can be brought into sharp focus in an image produced from the hologram.

Figure 4:
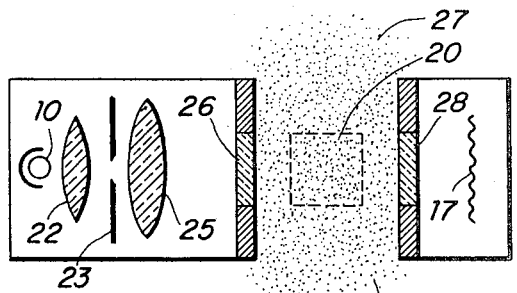
FIG. 4 is a diagrammatic illustration showing the optical apparatus for forming a far field hologram as used in the present invention.

FIG. 4 shows the formation of a hologram for purposes of the invention. The object is depicted as sample volume 20 of aerosol 21. The object may be any type of particles distributed in a fluid medium. Thus it may be water and/or liquid particles distributed in air or some other gaseous medium. The particles may be gas bubbles in a liquid such as air bubbles in water or the object may be any form of particulate matter suspended in either gaseous or liquid media.

Quasi-monochromatic source of radiant energy 10, such as a laser, filtered arc lamp or filtered vapor lamp is arranged to be focused by lens 22 onto pinhole aperture 23. Pulse lasers are particularly desirable since their intensity, in terms of usable output for the present purpose, is high enough to permit a sufficiently fast exposure to effectively stop all particle motion. Following lens 25, is window 26 opening onto space 27 for admittance of sample volume 20. Second window 28 follows space 27 and faces photosensitive member 17.

The apparatus shown in FIG. 4 is entirely enclosed except for space 27 which is left completely open to the outside. Thus when the whole apparatus is placed in a medium to be analyzed, a sample volume of the medium will fill space 27 without any significant disturbance of the medium. Separation between the mass of the medium and the sample volume does not occur.

In operation, space 27 is permitted to fill with sample volume 20 of material for analysis. Coherent waves from source 10 concentrated on aperture 23 by lens 22, are collimated by lens 25 and pass through window 26 to illuminate sample volume 20. "Illuminate" as used herein means expose to a source of radiant energy. A "sample volume" is taken to be a predetermined volume of space occupying the object plane of the optical system and any matter contained therein. The coherent waves are modified by sample volume 20, pass through window 28 and illuminate photosensitive medium 17.

It will be understood that FIG. 4 and the above descriptions are greatly simplified and various modifications are desirable for forming holograms depending on the characteristics of the medium. For example, it is possible, with low density clouds, to open up space 27 as illustrated in FIG. 4 to a much greater depth than that of the sample volume. Since the additional cloud material will be out of focus during analysis it will not affect the analysis. With this additional depth, it becomes possible to avoid disturbance of the sample volume by boundary conditions.

The separation between photosensitive member 17 and the individual particles in sample volume 20 in FIG. 4 must agree with the relation $$z > \frac{d^2}{\lambda}$$

previously stated. The hologram formed on photosensitive member 17 thus becomes a far field hologram. In reconstructing the particles in the sample volume from the far field hologram, the virtual image produced by the conjugate wave is so far out of focus that it amounts only to a uniform contribution to background.

Figure 5:
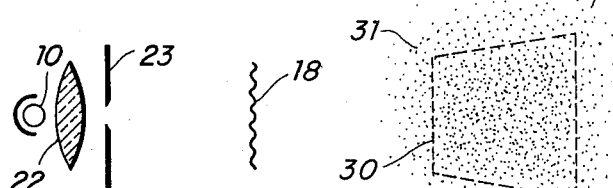
FIG. 5 is a diagrammatic illustration of an optical system for displaying a reconstructed sample volume in accordance with the invention.
Figure 6:
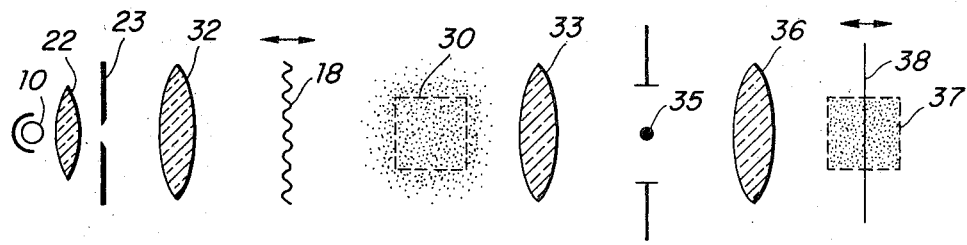
FIG. 6 is a diagrammatic illustration of a first embodiment for displaying a reconstructed sample volume with enhanced contrast in accordance with the invention.
Figure 7:
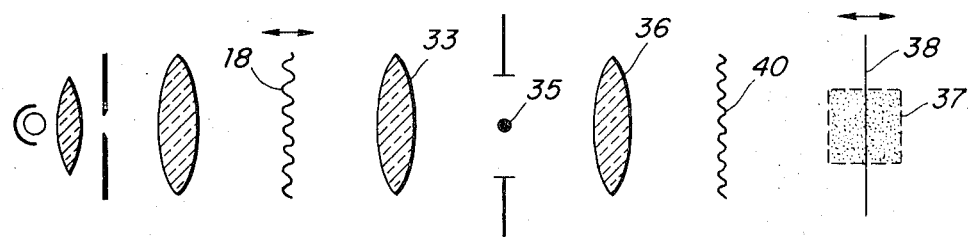
FIG. 7 is a diagrammatic illustration of a second embodiment of an optical system for displaying a sample volume with enhanced contrast in accordance with the invention.

FIGS. 5 through 7 show optical arrangements for reconstructing the sample volume from the hologram.

In FIG. 5, source 10, lens 22 and screen 23 having a pinhole aperture is a small source of electromagnetic radiation. Since the radiation illuminating the hologram 18 need not be collimated, lens 12 is unnecessary. The addition of a condensing or collimating lens would bring more of the energy radiating from screen 23 onto hologram 18. However the hologram may be moved up close to screen 23 so that the hologram intercepts a substantial portion of the radiant energy while remaining spaced far enough to retain some uniformity of illumination.

If radiation source 10 in FIG. 5 has the same wavelength as the radiation source used in forming hologram 18 and hologram 18 is illuminated with a collimated beam, then without benefit of further lenses, reconstructed sample 30 will appear a distance behind hologram 18 equivalent to the distance of the original sample volume in front of the photosensitive member from which hologram 18 was made. If the beam illuminating hologram 18 is divergent, then the closer the hologram is moved to the source, the farther back the reconstructed sample volume will appear. When the beam illuminating hologram 18 is collimated, the reconstructed sample volume will have the same size as long as the wavelength of the source is the same as that used in making the hologram. However, when the beam is divergent the reconstructed sample volume will increase in size as the hologram is moved closer to the source. This magnification can become so great that, before hologram 18 is positioned close enough to the source to receive nonuniform illumination, the energy per unit area of the reconstructed volume will become so small as to be practically useless. The magnification and location of the image are inversely related to the radius of curvature of the beam at the point where the hologram is illuminated. Using a point source it will be noted that the radius of curvature becomes increasingly short as the hologram is moved closer to the source.

No lens elements have been illustrated or described as necessary in forming the image 30. This is true since the diffraction patterns of the individual particles of the sample volume as recorded in hologram 18 have the essential characteristics of a zone plate lens. Thus the diffraction pattern of each particle not only carries the information representative of the particle but also acts as its own lens to reconstruct the image of the particle. When the wavelength of a source illuminating hologram 18 is changed from that used to form the hologram, the magnification and/or position of the reconstructed sample volume will change also. The relationships determining this are as follows:

The general principle can be stated:

$$\frac{z_2 \lambda_2}{z_1 \lambda_1} = m$$

Where $z_2$ is the distance between the hologram and the sharply focused reconstruction; $\lambda_2$ is the wavelength used for the reconstruction; $z_1$ is the distance from the original particle to the film in making the hologram; $\lambda_1$ is the wavelength used for making the hologram; and $m$ is the magnification in the sharply focused reconstruction.

It can be assumed that $\lambda_2$, $\lambda_1$ and $z_2$ will usually be known. If the radiation is collimated so that both the hologram and the reconstruction are made with plane waves, the magnification is 1. When spherical waves are used, the magnification will be inversely related to the radius of the spherical wave at the plane of the hologram (i.e. the photosensitive member during construction and the hologram during reconstruction).

The reconstructed sample volume 30 can be inspected by intercepting the reconstructed sample volume with a screen or sheet of ground glass or the like at an inspection plane within the reconstructed sample volume carrying the particular particles to be examined. Thus the image of these particles will be in sharp focus while other particle images in the reconstructed sample volume will be out of focus in accordance with displacement from the plane of interception. Since, as illustrated in FIG. 4, the hologram will commonly contain information of particles both in front and in back of the sample volume, images of these particles will also appear in extension 31 of the reconstructed sample volume. Provided the density of the particle images in extension 31 of the reconstructed sample volume is not too great, they can be ignored while inspecting the reconstructed sample volume and will provide only a low background noise. While a screen at the inspection plane helps locate a desired image, a reconstructed image can be viewed in space directly. However seeing it with the naked eye is inhibited by focussing difficulties. This will be discussed further in relation to FIG. 8.

FIG. 5 depicts sample volume 30 reconstructed in accordance with the invention in its most simple form.

The elimination of optical lenses avoids distortion and other interfering disturbances due to lens quality and foreign materials that may collect on the surfaces of lenses. However, lenses may be added to the system to collimate the source and magnify or change the position of the reconstructed image. Optical systems may also be added to enhance contrast or otherwise modify the energy appearing on the final reconstructed sample volume to facilitate inspection and analysis.

FIGS. 6 and 7 illustrate two embodiments for reconstructing a sample volume while blocking background illumination. In FIG. 6 radiation from source 10 is collimated by lens 32 and illuminates hologram 18 with the collimated beam to form reconstructed sample volume 30. Using a divergent beam as in FIG. 5, moving hologram 18 back and forth will change both position and magnification of the reconstructed sample volume. However, using a collimated beam, as in FIG. 6, moving hologram 18 back and forth will change the position of reconstructed sample volume 30 but not its magnification nor its position related to the hologram.

In FIG. 6 the first reconstructed sample volume 30 is ignored and a lens 33 following the first reconstructed sample volume 30 brings any remaining collimated components of the illuminating beam to a focus at a central stop 35. The central stop 35 is followed by a second lens 36 which forms a final reconstructed sample volume 37. A display screen or ground glass plate 38 is arranged so that it can be adjusted to intercept any plane of the final reconstructed sample volume. Hologram 18 may be positioned immediately adjacent to collimating lens 32. This has the advantages of compactness and minimum losses from dust particles in the air. Lens 33 can be positioned one focal length from the reconstructed sample volume 30 in which case it will focus the reconstructed sample volume at infinity while focusing any collimated light, i.e. light undeviated by the hologram, in the back focal plane of the lens. In this case, central stop 35 will be positioned in the back focal plane of lens 33. Lens 36 can then be positioned a focal length from central stop 35 in which case it will form the final reconstructed image 37 one focal length away in its back focal plane. With the arrangement thus stated, the Fourier transform of reconstructed sample volume 30 would appear in the back focal plane of lens 33. Nearly all background illumination will appear at the center of this transform and thus will be blocked by central stop 35. Lens 36 provides the inverse transform function so that final sample volume 37 is reconstructed in the back focal plane of lens 36 without the background illumination.

In the embodiment of FIG. 5 the particle images will appear bright or dark against a light background or vice versa depending upon whether hologram 18 is a negative or a positive. As final reconstructed sample volume 37 in FIG. 6 contains no background illumination, the particle images will appear light against a dark background regardless of whether hologram 18 is a positive or a negative.

While the arrangement of FIG. 6 has just been stated in the simplest mathematical sense in which the Fourier transform of the reconstructed sample volume is in a plane of the central stop 35, this is not a necessary limitation. If, for example, hologram 18 is moved while lenses 33, 36 and central stop 35 are maintained in the same position, reconstructed sample volume 30 will not be located a focal length in front of lens 33 thus its Fourier transform will not appear in the back focal plane of lens 33. This has very little effect on the imaging process. Central stop 35 will still block background illumination and a final reconstructed image 37 will still be obtained, although in a different plane, by lens 36.

Once the background illumination has been removed from the image information, disturbing effects are minimized and further optical operations can be added with minimum deterioration of the image.

Since the hologram technique produces high contrast images from small optical disturbances in the object plane (i.e. location of sample volume), it is desirable to keep surfaces of any kind spaced well away from the object plane. Glass lenses, windows and filters for example always contain optical imperfections of some kind and will also pick up dust particles and foreign matter on their surfaces.

A variation on FIG. 6 is illustrated in FIG. 7. In the embodiment of FIG. 7, background illumination is removed prior to reconstruction of the sample volume. Thus in FIG. 7, lens 33 is placed a focal length in front of hologram 18 instead of in front of reconstructed volume 30 as in FIG. 6. The transform of hologram 18 thus appears at the transform plane and the undeviated light is blocked by central stop 35. Second lens 36, separated from lens 33 by the sum of their two focal lengths, forms an image 40 of the hologram at the back focal plane of lens 36 and the reconstructed sample volume appears behind hologram image 40 the same distance as it would have appeared behind hologram 18 in the absence of the optical system.

Figure 8:
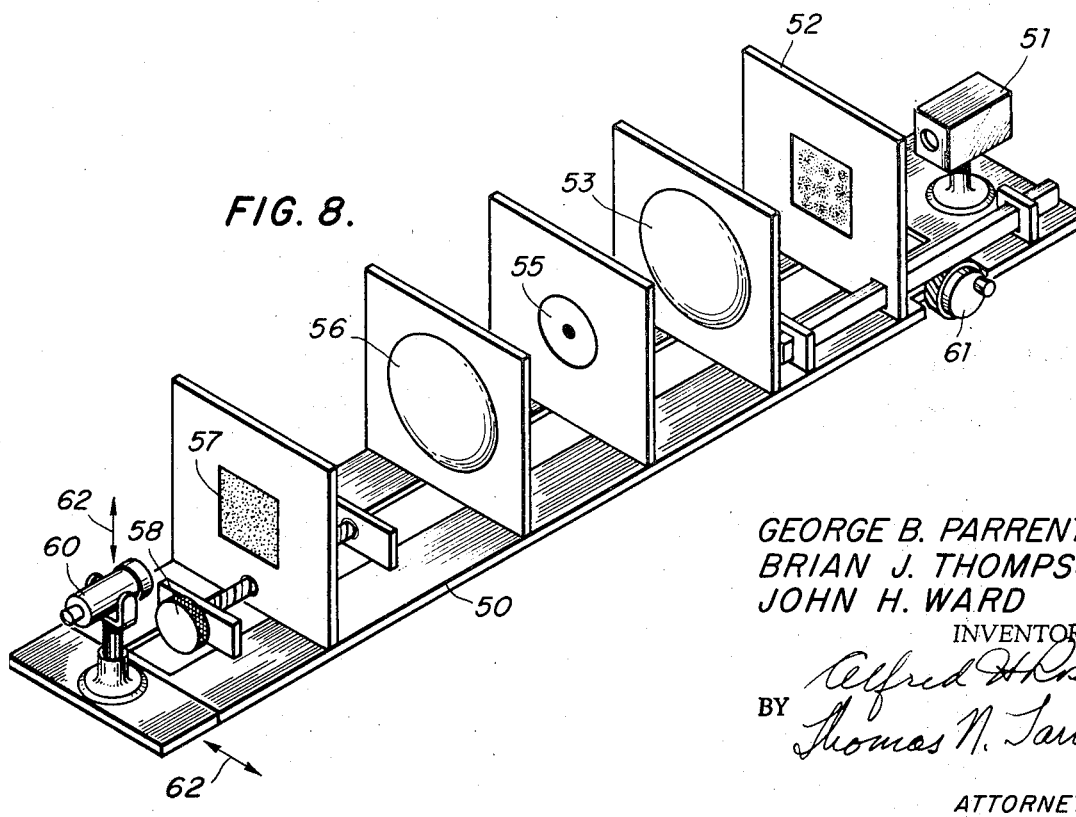
FIG. 8 is a projection of a third embodiment of optical apparatus for analyzing a reconstructed sample volume in accordance with the invention.

FIG. 8 is a perspective of apparatus that can be operated in the form of either FIG. 6 or FIG. 7 and includes an optical device for analyzing the reconstructed sample volume.

The apparatus of FIG. 8 comprises table 50 supporting in sequent coherent radiation source 51, frame 52 for supporting a hologram, first converging lens 53, central stop 55, second converging lens 56, translucent screen 57, micrometer screw means 58 and optical analyzing device 60.

For operation, frame 52, lenses 53 and 56 and central stop 55 are positioned in accordance with either FIG. 6 or 7 so that a hologram in frame 52 forms a reconstructed image on translucent screen 57. Screen 57 suitably is frosted glass or a similar translucent material that will diffuse the image light so that the image is visible to the eye from either side of the screen. The diffusing grain of screen 57 should be fine relative to the particle images so as not to distort the images in a way that will prevent accurate measurement.

Screen 57 is shown mounted in an adjustable frame for movement back and forth along the optical axis. This movement is obtained by micrometer screw 58 providing a screw drive to the frame supporting screen 57. The micrometer screw is adjusted to bring selected planes of the reconstructed volume in sharp focus as desired for inspection.

Optical device 60 is a microscope device containing suitable scales marked on an internal reticule (not shown) as calibrations for measuring particle images in the reconstructed sample volume. Device 60 is fitted with conventional gear arrangements to permit lateral and vertical adjustment with respect to table 50. These gear arrangements are not shown in detail but are depicted symbolically by crossed arrows 62.

While the apparatus of FIG. 8 is a preferred arrangement, many variations of it are possible without departing from the inventive concept. For example, lens 56 may be removed and a reconstructed volume will still appear. However without lens 56, there will be different magnification for different planes within the sample volume. Also as has been stated previously, various arrangements of the system will produce magnification of the reconstructed volume.

A simple embodiment of the FIG. 8 apparatus eliminates screen 57 along with its transport mechanism and provides for movement of the hologram frame 52 back and forth by a calibrated drive mechanism 61. In this variation, high resolution optical analyzer 60 remains in a fixed focus at an inspection plane. Moving the hologram back and forth presents different planes of the reconstructed sample volume at the inspection plane. As has been previously stated, no screen is necessary at the inspection plane and the use of a high resolution optical analyzer avoids any difficulty in focussing on specific particle images in the inspection plane.

Bearing in mind that the conditions for Fraunhofer or far-field diffraction patterns are not sharply demarcated from the conditions for Fresnel diffraction patterns, but that, as is well known, change gradually from one type to the other, such scope includes cases where substantial approach to the far-field diffraction patterns is satisfactory for practical purposes.

What is claimed is:
1. A method of analyzing particle content in a fluid medium comprising:
  (a) coherently illuminating a sample volume of particles suspended in a fluid medium with a beam of electromagnetic radiation;
  (b) exposing a photosensitive medium positioned in the near field of the illuminating beam and the far field of said particles with said radiation as modified by passing through said sample volume;
  (c) developing said photosensitive medium to form a far field hologram of said particles;
  (d) coherently illuminating said hologram so as to reconstruct said sample volume; and
  (e) optically analyzing said sample volume as reconstructed.

2. A method of displaying a sample volume of particles distributed in a fluid medium comprising:
  (a) forming a far field hologram of particles in a sample volume of said medium;
  (b) illuminating said hologram with collimated coherent radiant energy so as to reconstruct an image of said sample volume and the particles therein; and,
  (c) blocking the radiant energy undeviated by said hologram so as to enhance contrast in said reconstructed image.

3. A method of displaying a sample volume according to claim 2 in which the step of blocking the undeviated radiant energy comprises positioning said hologram in the front focal plane of a converging lens so that said lens focuses the hologram at infinity while focusing the source of said radiant energy in the back focal plane of said lens and stopping the center of said back focal plane.

4. A method of displaying a sample volume according to claim 2 in which the step of blocking the undeviated radiant energy comprises reconstructing said image of said sample volume in the front focal plane of a converging lens so that said lens focuses said image of said sample volume at infinity while focusing collimated light at the back focal plane of said lens, stopping the center of said back focal plane, and forming a final reconstructed image with enhanced contrast.

5. A holographic photostorage and retrieval method for use with volumes of moving microscopic objects, comprising:
  illuminating a volume of objects in motion with a pulse of coherent quasi-monochromatic radiation, the duration of which pulse is less than the mean time required for an object in the volume to move a short distance relative to its length;
  forming a latent hologram of said volume of particles by exposing to said pulse of radiation a photosensitive medium located a distance $z$ from said volume defined by $$\frac{D^2}{\lambda} > z > \frac{d^2}{\lambda}$$

where $D$ is the effective diameter of the radiation beam illuminating said volume, $d$ is the diameter of the objects of interest, and $\bar{\lambda}$ is the mean wavelength of said radiation;
  developing said photosensitive medium to form a far field holographic record of said volume of objects; and illuminating said record with a beam of coherent quasi-monochromatic radiation to form a three-dimensional aerial reconstruction of said volume.

6. A method as defined by claim 1 further comprising the step of positioning said photosensitive medium a distance z from said volume defined by $$\frac{D^2}{\bar{\lambda}} > z > \frac{d^2}{\bar{\lambda}}$$

where D is the effective diameter of the radiation beam illuminating said volume, d is the diameter of said particles, and $\bar{\lambda}$ is the means wavelength of said radiation.

References Cited

UNITED STATES PATENTS

| | | |
|---|---|---|
| 2,492,738 | 12/1949 | Gabor. |
| 2,494,441 | 1/1950 | Hiller. |
| 2,982,176 | 5/1961 | Kay. |
| 3,083,615 | 4/1963 | El-Sum. |
| 2,770,166 | 11/1956 | Gabor. |

OTHER REFERENCES

J. Applied Meteorology, vol. 3, December 1964, pp. 792–801, Silverman, "A Laser Fog Disdrometer."

Leith, "Reconstructed Wave Fronts . . .," J.O.S.A., vol. 52, No. 10, October 1962, pp. 1123–1130.

Thompson, "Diffraction by Opaque and Transparent Particles," J.S.P.I.E., vol. 2, December 1963–January 1964, pp. 43–46.

Parrent, Jr., et al., "On Fraunhofer Diffraction Patterns . . ." Optica Acta, vol. 11, No. 3, July 1964, pp. 183–193.

Bragg, et al., Nature, vol. 167, Feb. 3, 1951, pp. 190–191.

RONALD L. WIBERT, Primary Examiner

WARREN A. SKLAR, Assistant Examiner

U.S. Cl. X.R.

250—228; 350—3.5, 162; 356—102